US00RE34425E

United States Patent [19]

Schultz

[11] E Patent Number: Re. 34,425

[45] Reissued Date of Patent: Nov. 2, 1993

[54] METHOD AND APPARATUS FOR MECHANICAL PLANARIZATION AND ENDPOINT DETECTION OF A SEMICONDUCTOR WAFER

[75] Inventor: Laurence D. Schultz, Boise, Id.

[73] Assignee: Micron Technology, Inc., Boise, Id.

[21] Appl. No.: 876,588

[22] Filed: Apr. 30, 1992

Related U.S. Patent Documents

Reissue of:

[64] Patent No.: 5,081,796
Issued: Jan. 21, 1992
Appl. No.: 563,054
Filed: Aug. 6, 1990

[51] Int. Cl.[5] ..... B24B 49/00

[52] U.S. Cl. ..... 51/165.74; 51/281 SF; 51/283 R; 364/474.06

[58] Field of Search ..... 51/281 SF, 281 R, 283 R, 51/131.1, 131.3, 55, 57, 165 R, 165.71, 165.74, 165.72, 165.75, 54, 56 R, 58, 59 R, 323; 356/358, 359, 363, 355; 364/474.06, 563

[56] References Cited

U.S. PATENT DOCUMENTS

| | | | |
|---|---|---|---|
| 3,156,073 | 11/1964 | Strasbaugh | 51/57 |
| 3,564,776 | 2/1971 | Aspden | 51/55 |
| 3,841,031 | 10/1974 | Walsh | 51/283 |
| 4,083,272 | 4/1978 | Miller | 51/58 |
| 4,193,226 | 3/1980 | Gill, Jr. et al. | 51/124 R |
| 4,365,301 | 12/1982 | Arnold et al. | 51/67 |
| 4,811,522 | 3/1989 | Gill, Jr. | 51/131.1 |
| 4,930,262 | 6/1990 | Sennewald | 51/165.4 |

FOREIGN PATENT DOCUMENTS

| | | | |
|---|---|---|---|
| 164773 | 7/1986 | Japan | 51/281 SF |
| 256342 | 10/1988 | Japan | 51/281 SF |
| 3121773 | 5/1991 | Japan | 51/281 SF |

*Primary Examiner*—M. Rachuba
*Attorney, Agent, or Firm*—Wells, St. John, Roberts, Gregory & Matkin

[57] ABSTRACT

A method and apparatus for mechanical planarization and endpoint detection of a semiconductor wafer or the like. The apparatus includes a polishing head for rotating the wafer under a controlled pressure against a rotating polishing platen. The polishing head is mounted such that the wafer can be moved across the polishing platen to overhang a peripheral edge of the polishing platen and expose the surface of the wafer. Endpoint detection apparatus in the form of a laser interferometer measuring device is directed at an unpatterned die on the exposed surface of the wafer to detect oxide thickness at that point. The laser light beam is enclosed in a column of liquid to clean the wafer surface at the point of detection and to provide a uniform reference medium for the laser light beam.

29 Claims, 3 Drawing Sheets

METHOD AND APPARATUS FOR MECHANICAL PLANARIZATION AND ENDPOINT DETECTION OF A SEMICONDUCTOR WAFER

Matter enclosed in heavy brackets [ ] appears in the original patent but forms no part of this reissue specification; matter printed in italics indicates the additions made by reissue.

FIELD OF THE INVENTION

This invention relates to the fabrication of integrated circuits and more particularly to a novel method and apparatus for mechanical planarization and endpoint detection of a semiconductor wafer.

BACKGROUND OF THE INVENTION

In the fabrication of integrated circuits (ICs), it is often necessary to polish a side of a part such as a thin flat wafer of a semiconductor material. In general, a semiconductor wafer can be polished to remove topography, surface defects such as crystal lattice damage, scratches, roughness, or embedded particles of dirt or dust. This polishing process is often referred to as mechanical planarization and is utilized to improve the quality and reliability of semiconductor devices. This process is usually performed during the formation of various devices and integrated circuits on the wafer.

In general, the mechanical planarization process involves holding or rotating a thin flat wafer of semiconductor material against a wetted polishing surface under a controlled pressure or temperature. A polishing slurry such as a solution of alumina or silica is utilized as the abrasive medium. A rotating polishing head is typically utilized to hold the wafer under controlled pressure against a rotating polishing platen. The polishing platen is typically covered with a relatively soft wetted material such as blown polyurethane.

Such apparatus for polishing thin flat semiconductor wafers are well known in the art. U.S. Pat. Nos. 4,193,226 and 4,811,522 to Gill, Jr. and U.S. Pat. No. 3,841,031 to Walsh, for instance, disclose such apparatus.

A particular problem encountered in the use of such polishing apparatus is in the determination that a part has been planed to a desired flatness or relative thickness. In the past, this typically has been accomplished by control of the rotational speed, downward pressure, and polishing time of the planarization process. As a final step, however, the part typically must be mechanically removed from the polishing apparatus and physically measured by techniques known in the art to ascertain dimensional and planar characteristics of the polished part. If the part does not meet specification, it must be loaded back into the polishing apparatus and planarized a second time. Alternately, the part may have been subjected to too much polishing and an excess of material may have been removed, rendering the part as substandard.

Additionally, the semiconductor wafer may be subjected to spatially non-uniform planarization due to the relative velocity differential between the outer peripheral portions and the interior portions of the rotating semiconductor wafer. The faster moving peripheral portions of the semiconductor wafer may, for instance, experience a relatively larger rate of material removal than the relatively slower moving interior portions. In the past, this problem has been approached by the use of a polishing head having a generally convex shape to impart a greater force on the interior portions of the semiconductor disc and a lesser force along the outer peripheral portions.

These planarization problems are compounded because the semiconductor wafer is held face down against the polishing platen: and, absent removing the semiconductor disc, there is no provision for monitoring the polishing process.

In general, there is a need in the mechanical planarization of semiconductor wafers to be able to detect or monitor the endpoint of the planarized wafer while the planarization process is in operation. The present invention is directed to a novel method and apparatus for endpoint detection of a semiconductor wafer which can be accomplished during the planarization process.

SUMMARY OF THE INVENTION

In accordance with the present invention, a novel method and apparatus for mechanical planarization and endpoint detection of a thin flat semiconductor wafer is provided. The apparatus of the invention generally stated comprises: polishing means in the form of a rotatable polishing platen and a polishing slurry; a rotatable polishing head adapted for carrying a semiconductor wafer and mounted for movement across and past the outer circumference of the polishing platen for overhanging or supporting a portion less than the entire semiconductor wafer on the polishing platen; and endpoint detection means in the form of a laser interferometer measuring device for detecting the thickness of a material to be planarized, such as an oxide formed on the semiconductor wafer.

The apparatus is adapted to detect the endpoint of a semiconductor wafer or portion thereof by a method which generally comprises the steps of: rotating the semiconductor wafer through a polishing slurry on a polishing platen; overhanging a portion of the semiconductor wafer over the peripheral edge of the polishing platen; and detecting, using laser interferometry and a laser beam contained in a column of liquid, the thickness of a portion of the semiconductor wafer such as an oxide coating of the wafer.

In use of the method and apparatus of the invention, a part to be mechanically planarized, such as a semiconductor wafer, is placed in a polishing head. The polishing head is mounted for rotation in a polishing slurry and for movement across a generally circular polishing platen. The polishing platen may also be rotated preferably in the same direction as the polishing head. The polishing head is adapted to be moved across and past the outer circumferential edge of the polishing platen and overhang the peripheral edge of the polishing platen.

Overhanging the semiconductor wafer across the edge of the polishing platen exposes the polished surface of the wafer and permits endpoint detection means, such as a laser interferometer measuring device, to be directed at the wafer surface to determine the endpoint. The endpoint detection may detect the thickness of a portion of the wafer such as an oxide (i.e. silicide) surface of the wafer or an edge thickness of the wafer.

The laser detection means is preferably pulsed in synchronization with a marker on the wafer such as an unpatterned die. As an example, the unpatterned die may include a metallic film having a silicide coating. The laser can be directed at the unpatterned die to detect the thickness of the silicide at the point. Other reference points at other locations on the disc can also be utilized to obtain an average thickness across the wafer.

The laser detection means of the invention is preferably contained within a column of liquid to clean the wafer of polishing slurry or the like at the point of measurement and to provide a uniform liquid reference medium for the laser beam.

Other objects, advantages, and capabilities of the present invention will become more apparent as the description proceeds.

DETAILED DESCRIPTION OF THE INVENTION

Figure 1:
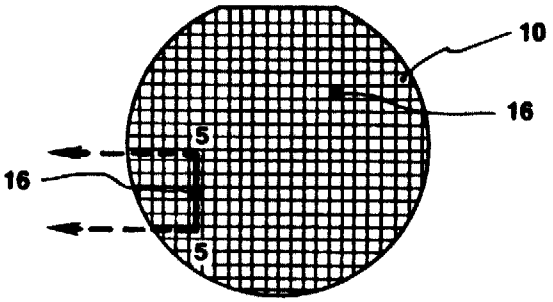
FIG. 1 is a plan view of a thin flat semiconductor wafer suitable for mechanical planarization by the method and apparatus of the invention.

Referring now to FIG. 1, a semiconductor wafer 10 suitable for mechanical planarization in accordance with the method and apparatus of the invention is shown. The semiconductor wafer 10 is thin and flat, generally circular in shape, and is formed with a micro topography. The semiconductor wafer may include a substrate such as silicon or oxidized silicon on which a plurality of individual integrated circuit dies are formed. These individual dies are represented schematically by the criss-cross pattern in FIG. 1.

The formation of integrated circuits requires the deposition of various films such as metal film contacts and resistive and dielectric films on the wafer substrate. During fabrication of the wafer 10, it may be necessary to mechanically planarize the surface of the wafer in order, for instance, to provide a planarized topography for definition of these films. This planarization process helps to minimize barriers to multilayer formation and metallization. Additionally, the planarization process smooths, flattens, and cleans the surface of the wafer.

Figure 5:
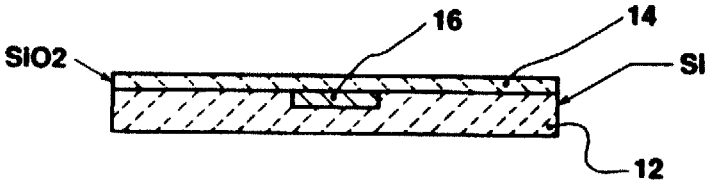
FIG. 5 is a cross-sectional view taken along section line 5—5 of FIG. 1.

As shown in cross-section in FIG. 5, the wafer 10, in a certain area, may include a silicon substrate 12 on which a layer of silicon dioxide ($SiO_2$) 14 (hereinafter referred to as oxide) is formed thereon. In general, mechanical planarization of the wafer 10 involves planarization of the oxide layer 14 of the wafer 10. The wafer 10 may also include one or more unpatterned dies 16 of a metallic film such as tungsten formed on the silicon substrate 12 and covered with the oxide coating 14.

Figure 2:
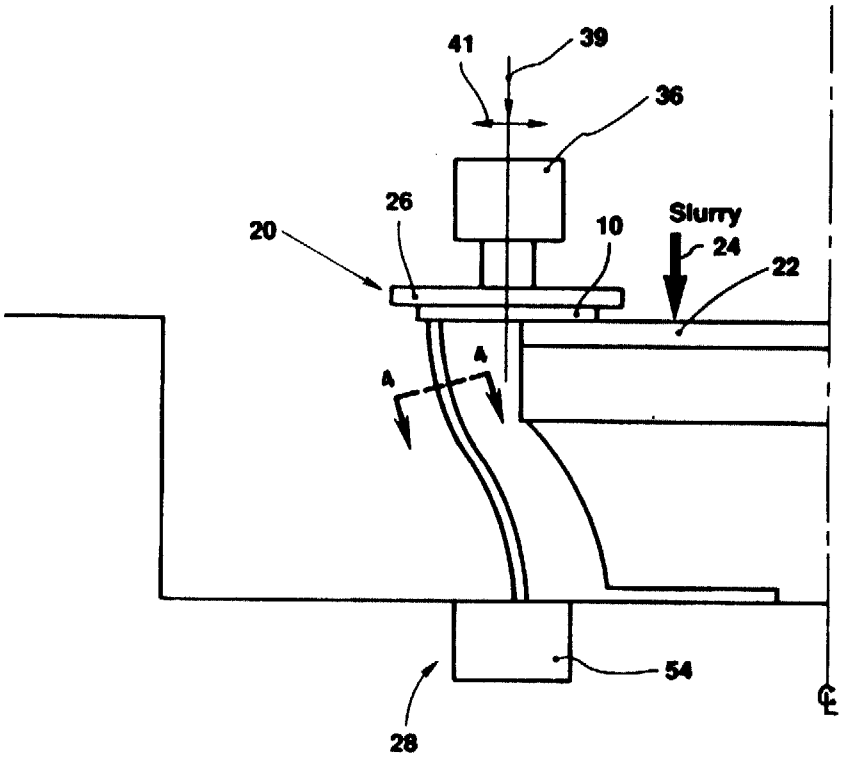
FIG. 2 is a side elevation view of a mechanical planarization apparatus with endpoint detection constructed in accordance with the invention.
Figure 3:
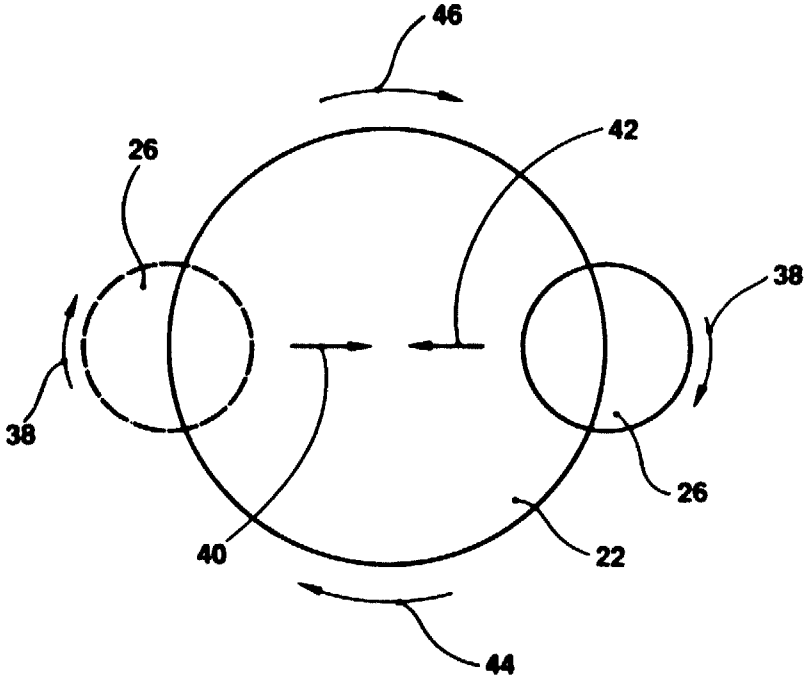
FIG. 3 is a schematic plan view showing relative rotation movement and positioning of a polishing head constructed in accordance with the invention with respect to a rotating polishing platen.

Referring now to FIG. 2, a mechanical planarization and endpoint detection apparatus constructed in accordance with the invention is shown and generally designated as 20. The apparatus 20 of the invention in general comprises:

polishing means in the form of a rotating polishing platen 22 to which an abrasive slurry 24 such as alumina is applied:

a rotatable polishing head 26 adapted for supporting the semiconductor wafer 10 and mounted as shown in FIG. 3, for movement across and past the peripheral edge of the rotating polishing platen 22 for overhanging a portion less than the entire semiconductor wafer 10 on the rotating polishing platen 22; and endpoint detection means in the form of a laser interferometer measuring device 28 for detecting the thickness of an oxide coating 14 or the like formed on the semiconductor wafer 10.

Figure 6:
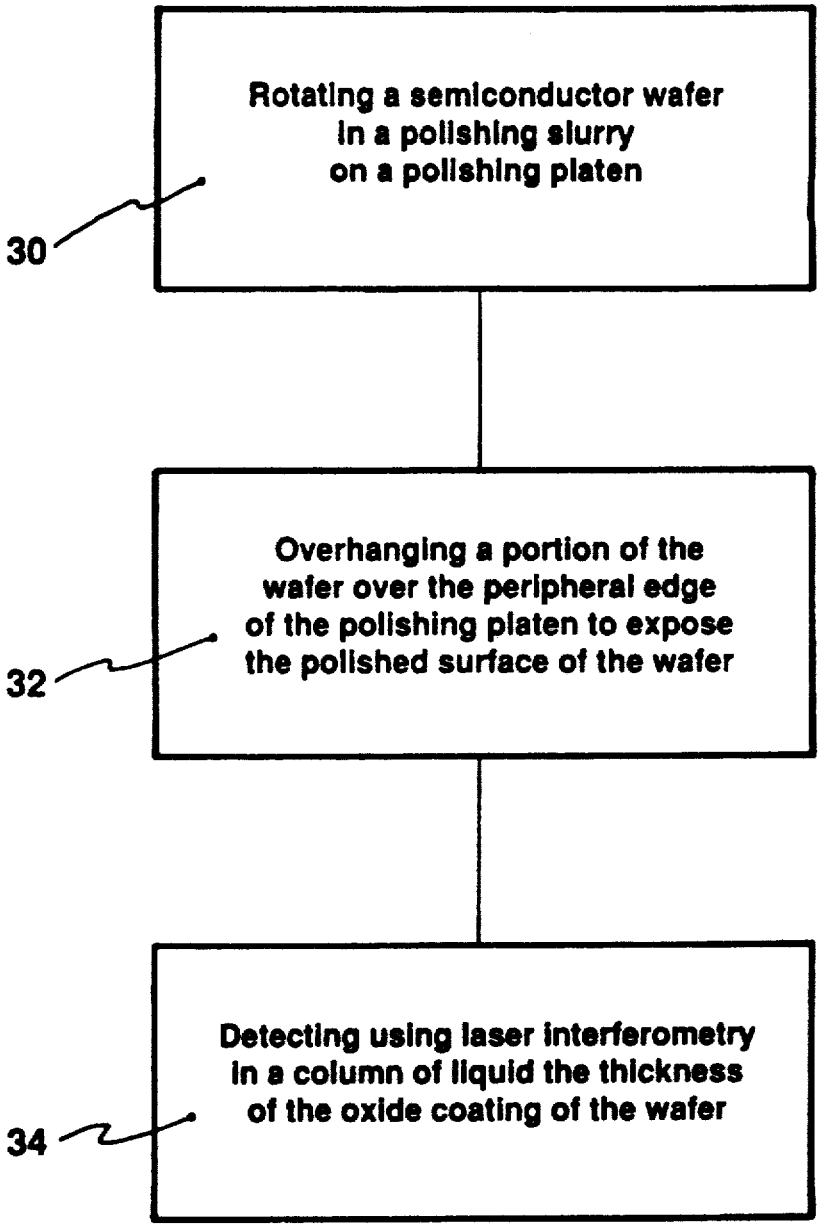
FIG. 6 is a schematic flow diagram of the method of the invention.

With reference to FIG. 6, the apparatus 20 of the invention is adapted to detect the thickness of the oxide coating 14 or the like on the wafer 10 by a process which includes the steps of:

rotating the wafer 10 in a polishing slurry 24 on a polishing platen 22, step 30;

overhanging a portion of the wafer 10 over a peripheral edge of the polishing platen 22, step 32; and detecting, using a laser interferometer measuring device 28 having a laser beam contained in a column of liquid, the thickness of the oxide coating 14 on a blank die 16 of the wafer 10, step 34.

With reference to FIGS. 2 and 3, the polishing means may include the polishing head 26 which is mounted to a rotational drive means such as a drive motor 36. As shown in FIG. 3, the drive motor 36 imparts a rotary motion indicated by arrow 38 to the polishing head 26. The polishing head 26 is constructed, as is known in the art, to hold and rotate the wafer 10 face down over the polishing platen 22, without damaging the wafer 10. Moreover, the polishing head 26 is constructed to impart a controlled downward force as indicated by arrow 39 (FIG. 2) to the wafer 10.

In addition to rotary and up-and-down movement, the polishing head 26 is also mounted for transverse movement in either direction across the polishing platen 22 as indicated by arrows 40,42 in FIG. 3 and arrow 41 in FIG. 2. Further, the polishing head 26 is mounted with respect to the polishing platen 22 such that the wafer 10 can be moved across the polishing platen 22 and held in an overhanging position with respect to the outer circumferential peripheral edge of the polishing platen 22. This is clearly shown in FIG. 2. With this arrangement and as is critical to the practice of the invention, the wafer 10 can be moved past the edge of the polishing platen 22 to overhang the outer circumferential or peripheral edge of the polishing platen 22 during the mechanical planarization process.

This overhanging arrangement permits the wafer 10 to be moved on and off the polishing platen 22 to compensate for polishing irregularities caused by the relative velocity differential between the faster moving outer portions and the slower moving inner portions of the generally circular shaped wafer 10. Additionally, with this arrangement, a portion of the face of the wafer 10, as shown in FIG. 2, is exposed to the laser interferonmeter measuring device 28 for endpoint detection as will hereinafter be more fully explained.

As shown in FIG. 3, the polishing platen 22 is also mounted for rotational motion in the same direction as the polishing head 26. This motion is denoted by arrows 44,46 in FIG. 3. The surface of the polishing platen may be formed of a relatively soft material such as blown polyurethane. Additionally, this surface may be wetted with a lubricant such as water.

As shown in FIG. 2, the abrasive slurry 24 is directed onto the surface of the polishing platen 22 to provide an abrasive medium for polishing the wafer 10. The slurry 24 may be formed of a solution of an abrasive material such as alumina or silica.

Figure 4:
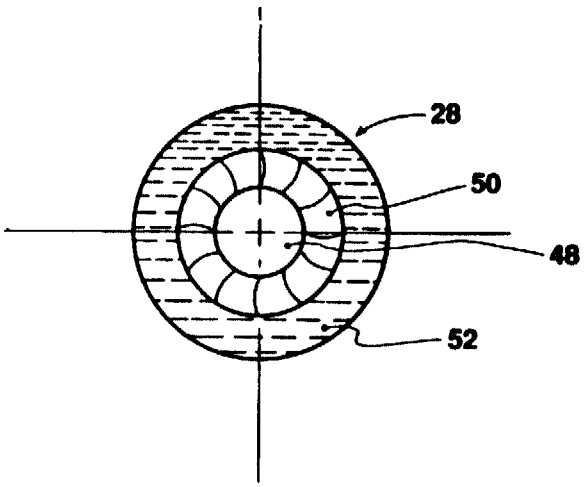
FIG. 4 is a cross-sectional view taken along section line 4—4 of FIG. 2.

With reference to FIGS. 2 and 4, the endpoint detection means of the invention is clearly shown. In the illustrative embodiment of the invention, the endpoint detection means comprises a laser interferometer measuring device 28. The interferometer measuring device 28 employs the interference of light waves for purposes of measurement. In the illustrative embodiment of the invention, the interferometer measuring device 28 is mounted to detect the thickness of the oxide layer 14 of the wafer 10 in the area of an unpatterned die 16 on the wafer 10. Alternately, the laser interferometer measuring device may also be arranged to detect the edge thickness of the wafer 10 or other features of the wafer 10.

As shown in FIG. 3, the laser interferometer measuring device 28 includes a laser light beam 48 and a light return conduit 50 which extend from a laser control unit 54 to a suitable mount (not shown ) located in close proximity to the exposed surface of the wafer 10. As is apparent in the illustrative embodiment of the invention, the interferometer measuring device 28 functions to direct and return a beam of laser light 48 or radiation against the oxide 14 located on the unpatterned die 16 of the wafer 10 to accurately measure the thickness of the oxide coating 14 at that point. This can be done by laser techniques known to those skilled in the art.

Further, and as shown in FIG. 4, a liquid conduit 52 directs a liquid such as water onto the oxide surface 14 at the point of measurement by the laser beam 48 on the wafer 10. As shown in FIG. 4, the liquid medium completely surrounds or encloses the laser light beam 48. This liquid [54] functions to clean the surface of the wafer 10 at the point of laser measurement and to provide a constant liquid reference background or medium for obtaining the laser measurement.

The apparatus and method of the invention thus provide for mechanical planarization of a semiconductor wafer with means for accurately detecting the endpoint of the surface or oxide thickness of the semiconductor wafer during the planarization operation. As is apparent from the foregoing description, this is accomplished by detecting an oxide thickness at a predetermined reference point (i.e unpatterned die). Other reference points on the wafer may also be utilized. Additionally, other types of measuring devices or multiple laser measuring devices and/or multiple reference points can also be utilized to obtain an average thickness.

While the process of the invention has been described with reference to a preferred embodiment, as will be apparent to those skilled in the art, certain changes and modifications can be made without departing from the scope of the invention as defined by the following claims.

I claim:

1. A process for polishing a flat wafer comprising:

a. holding the wafer in a rotatable polishing head mounted for movement across and over a peripheral edge of a polishing platen;

b. rotating a surface of the wafer in a polishing slurry across the polishing platen;

c. overhanging a portion of the wafer across a peripheral edge of the polishing platen to expose a surface of the wafer; and d. detecting using endpoint detection means an endpoint of the wafer.

2. A process as claimed in claim 1 and wherein the endpoint detection means comprises a laser interferometer measuring device.

3. A process as claimed in claim 2 and wherein the laser interferometer measuring device is situated to detect the thickness of an oxide on the wafer located on an unpatterned die on the wafer.

4. A process as claimed in claim 3 and wherein the polishing platen is also rotatably mounted for rotation in the same direction [a] *as* the polishing head.

5. A process as claimed in claim 3 and further comprising:

directing a column of liquid on the wafer for cleaning the wafer and for providing a reference medium for the laser.

6. A process for polishing a thin flat semiconductor wafer having an oxide surface comprising:

a. holding the semiconductor wafer in a rotatable polishing head mounted for movement across and over a peripheral edge of a polishing platen;

b. rotating the wafer in a polishing slurry across the polishing platen;

c. overhanging a portion of the wafer across a peripheral edge of the polishing platen to expose a surface of the wafer; and d. detecting a thickness of the oxide coating of the wafer utilizing a laser detection apparatus having a detecting laser beam enclosed in a column of water and directed at an unpatterned die on the wafer surface.

7. The process as claimed in claim 6 and further comprising:

rotating the polishing platen in the same direction as the polishing head.

8. The process as claimed in claim 6 and further comprising:

moving the polishing head across the peripheral edge of the polishing platen to compensate for a velocity differential between different portions of the rotating wafer.

9. The process as claimed in claim 8 and wherein:

the wafer, polishing head, and polishing platen are each generally circular in shape.

10. The process as claimed in claim 8 and wherein: the unpatterned die includes a metallic film having an oxide coating thereon.

11. A process for polishing a thin flat generally circular shaped semiconductor wafer having an oxide coating and for detecting the thickness of the oxide coating, comprising:

a. holding the semiconductor wafer in a rotatable polishing head;

b. rotating the semiconductor wafer over a rotating polishing platen under pressure from the polishing head in a polishing slurry;

c. overhanging a portion of a surface of the semiconductor wafer over the polishing platen to expose the surface for endpoint detection of an oxide on the semiconductor wafer;

d. directing a laser beam enclosed in a column of liquid at an unpatterned die on the wafer, for detecting using laser interferometry a thickness of an oxide coating on the wafer; and e. moving the wafer across the peripheral edge of the polishing platen for overhanging the wafer and for compensating for velocity differentials on different portions of the generally circular shaped wafer.

12. The process as claimed in claim 11 and wherein: the semiconductor wafer is formed of silicon having a silicide surface and the unpatterned die includes a tungsten film with an oxide coating.

13. Apparatus for mechanically planarizing a thin flat wafer comprising:

a. polishing means including a polishing platen and an abrasive slurry;

b. a polishing head for holding the wafer and mounted for rotating and for moving the wafer across the polishing platen and past a peripheral edge of the polishing platen under a controlled pressure; and c. endpoint detection means including a laser interferometer with a laser beam contained in a column of liquid for detecting an endpoint on an exposed surface of the wafer.

14. Apparatus as claimed in claim 13 and wherein: the polishing platen is rotated in the same direction as said polishing head.

15. Apparatus as claimed in claim 14 and wherein: the laser interferometer detection device includes a laser light beam, a return light conduit, and a liquid conduit which is arranged to direct a liquid at the exposed surface of the wafer to surround the laser light beam and clean a surface of the wafer and to provide a uniform reference medium for the laser light beam.

16. Apparatus as claimed in claim 15 and wherein: the laser light beam is directed at an unpatterned die on the wafer.

17. Apparatus as claimed in claim 16 and wherein: the unpatterned die includes a metallic film having an oxide coating formed thereon.

18. Apparatus as claimed in claim 17 and wherein: said metallic film is tungsten and said oxide film is a silicide.

19. Apparatus for mechanically planarizing a thin flat semiconductor wafer comprising:

a. polishing means including a rotating generally circular shaped polishing platen and an abrasive slurry;

b. a polishing head for holding the semiconductor wafer and mounted for rotation and for moving the wafer across a peripheral circumferential edge of the polishing platen under a controlled pressure to expose a surface of the wafer; and c. endpoint detection means including a laser interferometer measuring device having a laser light beam directed at an unpatterned die on the surface of the wafer and including a control unit, a light return conduit, and a liquid conduit circumjacent to the laser light beam for directing a liquid at the wafer surface to clean the surface and provide a reference medium for the laser light beam.

20. Apparatus as claimed in claim 19 and wherein: said unpatterned die includes a metallic film coated with an oxide.

21. Apparatus as claimed in claim 19 and wherein: said polishing platen is rotated in the same direction as the polishing head.

22. Apparatus as claimed in claim 21 and wherein: said liquid for surrounding the laser light beam is water.

*23. A process for polishing a flat wafer comprising:*

*a. holding a wafer in a rotatable polishing head mounted for movement across and over a peripheral edge of a polishing platen;*

*b. rotating a surface of the wafer in a polishing slurry across the polishing platen; and*

*c. overhanging a portion of the wafer across a peripheral edge of the polishing platen to expose a surface of the wafer.*

*24. A process as claimed in claim 23 wherein the polishing platen is also rotatably mounted for rotation in the same direction as the polishing head.*

*25. A process as claimed in claim 23 further comprising: moving the polishing head across the peripheral edge of the polishing platen to compensate for a velocity differential between different portions of the rotating wafer.*

*26. A process as claimed in claim 23 further comprising overhanging approximately one-half of the wafer across the peripheral edge of the polishing platen.*

*27. A process as claimed in claim 23 wherein: the wafer, polishing head, and polishing platen are each generally circular in shape.*

*28. A process for polishing a thin flat generally circular shaped semiconductor wafer having an oxide coating comprising:*

*a. holding a semiconductor wafer in a rotatable polishing head;*

*b. rotating the semiconductor wafer over a rotating polishing platen under pressure from the polishing head in a polishing slurry; and*

*c. moving the wafer across a peripheral edge of the polishing platen for overhanging the wafer and for compensating for velocity differentials on different portions of the generally circular shaped wafer.*

*29. A process as claimed in claim 28 further comprising moving approximately one-half of the wafer across the peripheral edge of the polishing platen.*

* * * * *